United States Patent [19]

Karch

[11] Patent Number: 4,793,620
[45] Date of Patent: Dec. 27, 1988

[54] SEALING ARRANGEMENT FOR THE CLOSURE OF A GAP

[75] Inventor: Rudi Karch, Lugwigshafen-Ruchheim, Fed. Rep. of Germany

[73] Assignee: Deere & Company, Moline, Ill.

[21] Appl. No.: 129,808

[22] Filed: Dec. 7, 1987

[30] Foreign Application Priority Data

Dec. 13, 1986 [DE] Fed. Rep. of Germany ....... 3642680

[51] Int. Cl.⁴ .......................... F16J 15/52; F16J 3/04
[52] U.S. Cl. ............................... 277/12; 277/212 FB; 74/566
[58] Field of Search ......... 277/12, 32, 212 R, 212 FB, 277/237; 74/560, 566

[56] References Cited

U.S. PATENT DOCUMENTS

| 2,547,593 | 4/1951 | Morris | 74/560 X |
| 4,043,217 | 8/1977 | Kleist | 74/560 X |

FOREIGN PATENT DOCUMENTS

| 935953 | 12/1955 | Fed. Rep. of Germany | 74/560 |
| 7117022 | 9/1971 | Fed. Rep. of Germany | . |
| 7122466 | 10/1971 | Fed. Rep. of Germany | . |
| 2328952 | 1/1975 | Fed. Rep. of Germany | . |
| 2738740 | 3/1979 | Fed. Rep. of Germany | . |
| 140308 | 3/1920 | United Kingdom | 74/566 |

OTHER PUBLICATIONS

Brochure by Claas Ohg, "Dominator," Sep. 1985, 3 pages.

*Primary Examiner*—Robert S. Ward

[57] ABSTRACT

An arrangement for sealing around a pedal which extends through an opening in a housing includes a flexible base slidably coupled to the housing. A frame is mounted on the base and carries rollers which engage an arm of the pedal. A flexible boot or sleeve has one end fixed to the frame and another end fixed to the arm of the pedal.

6 Claims, 2 Drawing Sheets

SEALING ARRANGEMENT FOR THE CLOSURE OF A GAP

BACKGROUND OF THE INVENTION

The invention concerns an arrangement for the closure of a gap between a moving part and a guide slot through which the part moves.

Such arrangements are conventionally used to prevent moisture, noise or dirt, etc., in one space from reaching a protected space. Hence, such arrangements are applied in operators' cabins, passenger compartments or motor vehicles, control units of machine tools and in container closures with movable inserts. In a known arrangement [Pamphlet NLI 9/85 (GDS) 300 from CLAAS OHG], the gap between an operator's platform and a pedal is closed by a soft plastic sleeve to prevent dust and noise from entering into the operator's cabin. This arrangement can only be used with parts which move in one direction only, or generally in one direction. As soon as the part moves in two or more directions, the sleeve must be extremely flexible. This requires the sleeve to become relatively large. Otherwise, it will be subject to stresses that lead to early damage.

Another sealing arrangement is shown in DE-A- No. 2 328 952. But this arrangement has a relatively large assembled height due to the number of sealing plates.

SUMMARY OF THE INVENTION

An object of this invention is to provide a compact arrangement for the closure of a gap between a pedal and a side slot, in which the pedal can move in at least two directions.

Another object is to provide a sealing arrangement with improved sealing capability, simplified installation of the pedal and improved durability.

These and other objects are achieved by the present invention which includes a flexible sleeve which absorbs the axial movement of the pedal arm and a sliding intermediate part which accommodates the transverse movement of the pedal arm.

The movement of the sliding part, which is dependent on the movement of tee pedal, will assure that the sleeve is required only to accommodate movement of the pedal arm along a central axis of the flexible sleeve. The sliding part includes a frame which supports rollers which engage the pedal arm. The frame is rigid and is mounted on a flexible base. The flexibility of the base permits adequate sealing of the gap with a very flat arrangement. By means of a bridge, the frame in the sliding part can be opened at one side to install the pedal and then closed. Closure of the gap against turbulent, moist media or against media under pressure is achieved by the strong adherence of the sleeve to the frame and hence to the flexible base.

DETAILED DESCRIPTION

Figure 1:
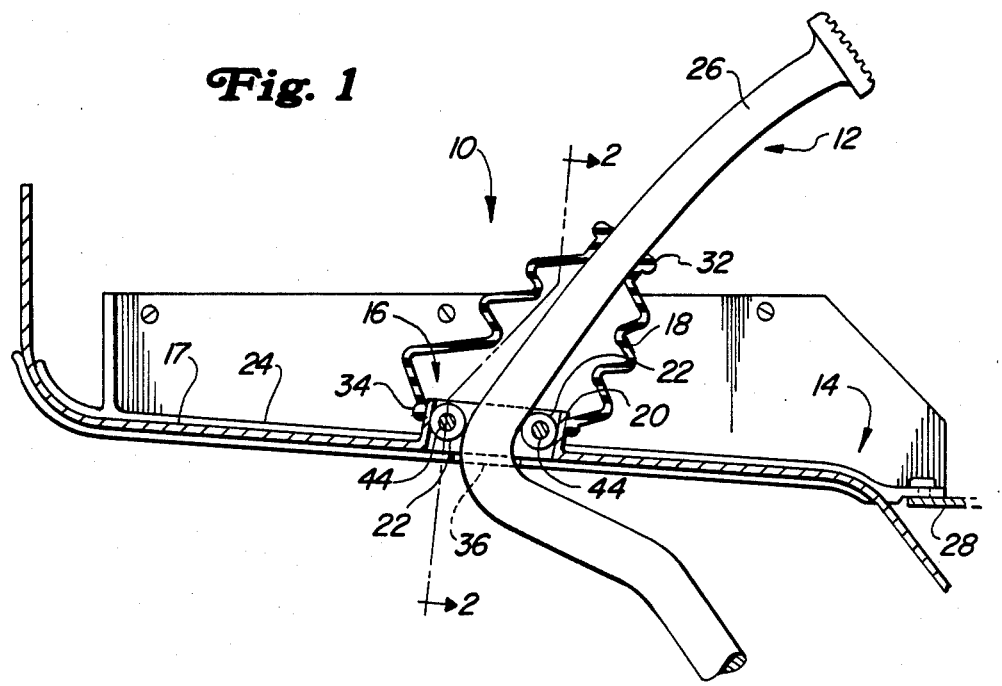
FIG. 1 shows a side view and vertical section of the invention of an arrangement for the closure of a gap.
Figure 2:
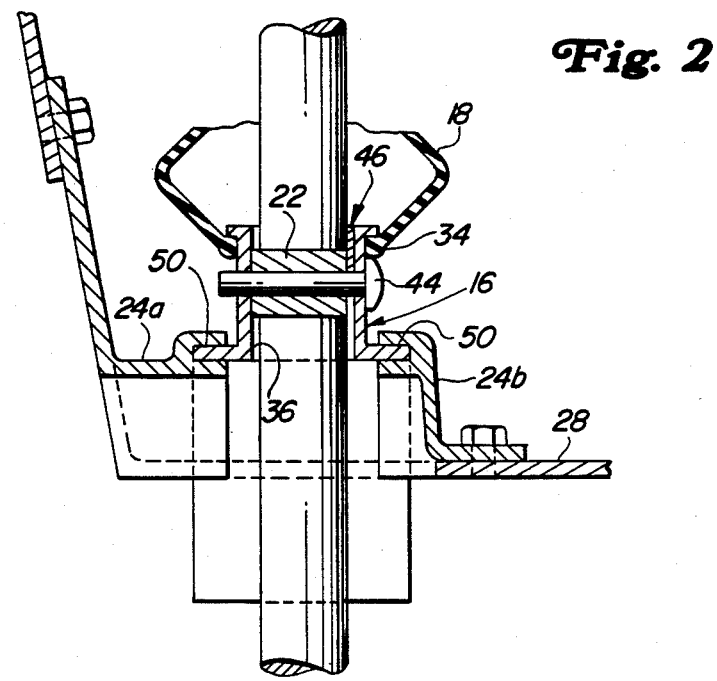
FIG. 2 shows a front view and section along the lines 2—2 of FIG. 1.

An arrangement 10 for closing a gap between a pedal 12 and a guide slot 14 includes an intermediate part or sliding member 16, a sleeve 18, a frame 20, two support rollers 22, and two retainers 24a and 24b.

The pedal 12 has an arm 26 which does not extend radially with respect to its pivot (not shown), but is bent at an angle. By reason of this configuration, the motion of pedal 12 includes an axial component along the axis of arm 26 and a transverse component parallel to the slot 14.

The pedal 12 extends through the guide slot 14 provided in the floor 28 of an operator's cabin of a vehicle such as an agricultural tractor and the arrangement 10 is intended to prevent cold and wet air, as well as dirt and sound vibrations in the space below the floor 28, from reaching the space above the floor 28.

The guide slot 14 in the floor 28 is formed by an opening sufficiently large to permit the movement of the pedal 1, and where a gap exists between the pedal arm 26 and the side of the opening which is to be sealed.

Figure 3:
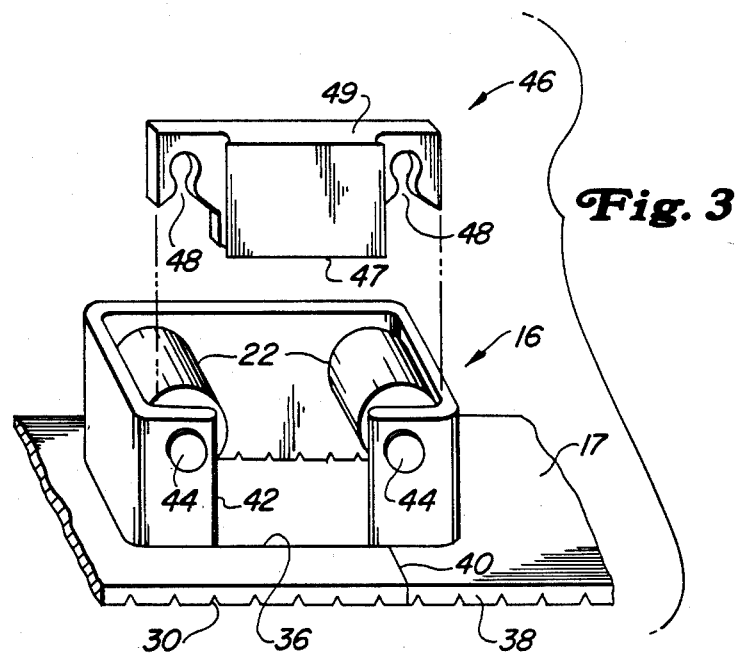
FIG. 3 shows a perspective view of an intermediate part included in the arrangement of FIG. 1.

The sliding member 16 has a base 17 with grooves 30 on the underside, as shown in FIG. 3, which provide a considerable flexibility of shape in one plane. These grooves 30 are required only if the base 17 is of considerable thickness. In a thin base 17, which is very flexible, the grooves could be omitted. The base 17 can slide in the retainers 24 to accommodate the transverse movement of the pedal 12. Preferably, the base 17 is so long that it extends beyond the ends of the retainers 24, when the pedal 12 has reached one of its end positions. Hence, the base 17 is approximately twice as long as the slot 14.

The sleeve 18 is preferably a simple rubber bellows, or a two-piece soft plastic bellows, which is assembled by sliding together axially and that can be pulled apart. At its upper and lower ends, it is provided with an elastic collar 32 and 34, that can be stretched within certain limits. The inside circumference of the upper collar 32 is sized so as to firmly grip the pedal arm 26. Alternatively, the upper collar 32 could be designed to be attached to the pedal arm 26 by a retaining ring, a lock wire or a sewing thread.

The frame 20 has a rectangular shape and is mounted on the base 17 adjacent an opening 36 in the base 17 through which the pedal arm 26 can pass. The frame 20 may be integral with the base 17 to form a one-piece configuration, or it may be attached by welding, by adhesive, or by friction locking means. A separation 40 is provided in the base 17 between the opening 36 and the edge 38 of the base 17. The frame 20 has a slot 42 on the side towards the edge 38 and the separation 40. The width of slot 42 corresponds to the minimum width of the pedal arm 26, so that the pedal arm 26 can be introduced into the opening 36, sideways through the separation 40 and hence into the interior of the frame 20.

The frame 20 supports axles 44, which in turn rotatably support rollers 22 inside the frame 20. The distance between the support rollers 22 is selected so that at its greatest width, the pedal arm 26 will fit between them, and they are so arranged that the pedal arm 26 makes contact with their periphery and rolls thereon. Since the pedal arm 26 does not rub on the walls of the frame 20, but rolls on one of the support rollers 22, there is no wear of the frame 20 due to the relative motion between the pedal 12 and the frame 20.

The slot 42 is closed by a T-shaped bridge 46 with a foot 47 which fills the slot 42, and a cross piece 49 with slits 48 on each side, which receives part o the axles 44. The ends of the cross piece 49 fit between the inner wall of the frame 20 and the end face of the support roller 22. The bridge 46 can be pushed into the slot 42 from above, in the sense of FIG. 3, and retain the axles 44 so that the frame 20 will not open up under high loads. In case that the frame 20 is not subjected to high loads, the bridge 46 could be omitted.

The lower collar 34 of the sleeve is tightly attached to the frame 20 and this pressure helps assure that the bridge 46 cannot escape from slot 42.

The retainers 24a and 24b are located on either side of the intermediate part 18 and are bolted to the floor 28. Each retainer includes a longitudinal groove 50 which slidingly receives a corresponding edge of the base 17.

For the installation, the pedal 12 is first introduced through the guide slot 14 in the floor 28 and into the opening 36 in the base 17 and into the interior of the frame 20 by way of the separation 40 in the slot 42. Following this, the slot 42 can be closed by the bridge 46. After that, the retainers 24 are bolted to the floor 28 in such a way that the base 17 is retained in the longitudinal grooves 50. Finally, the sleeve 18 is slid over the pedal with its lower collar 34 attached to the frame 20. The upper collar 32 is slid to a location on the pedal arm 26, such that the sleeve 18 is not stretched excessively at one end point of the motion of the pedal 12, and not excessively compressed in the other end position.

It can be seen from FIG. 1 that during a counter-clockwise sliding/pivoting motion of the pedal 12, the sleeve 18 will be compressed and the sliding member 16 will be moved to the left while the pedal arm 26 rolls upon the support rollers 22. It can be seen that the sleeve 18 will be compressed and expanded substantially only along its axis and along the axis of arm 26 because lower collar 34 moves along with sliding part 16.

While the invention has been described in conjunction with a specific embodiment, it is to be understood that many alternatives, modification and variations will be apparent to those skilled in the art in light of the aforegoing description. Accordingly, this invention is intended to embrace all such alternatives, modifications and variations which fall within the spirit and scope of the appended claims.

For example, instead of a sliding member 16 in form of a sliding cover, it would be possible to use a part mounted on rollers or to use a deformable housing that can be moved relative to the guide slot 14 and is attached to the sleeve 18, in order to absorb the tangential component of the motion of the pedal 12.

I claim:

1. An arrangement for sealing between an arm which extends through an opening in a housing and which is movable with respect to the housing, comprising:
    a slide member which receives and engages the arm and which is coupled for sliding movement only with respect to the housing; and
    a flexible sleeve with a first end sealingly engaging the arm and with a second end sealingly engaging the member.

2. The arrangement of claim 1, wherein movement of the arm causes the member to slide with respect to the housing.

3. The arrangement of claim 1, further comprising:
    a retainer fixed with respect to the housing, the retainer having a slot for slidably receiving a portion of the member.

4. The arrangement of claim 1, wherein:
    the member rotatably supports rollers which engage the arm.

5. The arrangement of claim 4, wherein the member comprises:
    a base; and
    a hollow frame mounted on the base, the rollers being mounted inside the frame and the second end of the sleeve engaging the outer surface of the frame.

6. The arrangement of claim 5, wherein:
    the frame has a slot on one side thereof for receiving the arm; and
    a bridge is releasably attachable to the frame to fill the slot.

* * * * *